United States Patent
Shinoda et al.

(10) Patent No.: US 10,054,834 B2
(45) Date of Patent: Aug. 21, 2018

(54) ELECTROCHROMIC ELEMENT

(71) Applicants: Masato Shinoda, Kanagawa (JP);
Satoshi Yamamoto, Kanagawa (JP);
Toshiya Sagisaka, Kanagawa (JP);
Daisuke Goto, Kanagawa (JP);
Tamotsu Horiuchi, Shizuoka (JP);
Hiroyuki Takahashi, Kanagawa (JP);
Fuminari Kaneko, Kanagawa (JP);
Mamiko Inoue, Kanagawa (JP); Tohru Yashiro, Kanagawa (JP)

(72) Inventors: Masato Shinoda, Kanagawa (JP);
Satoshi Yamamoto, Kanagawa (JP);
Toshiya Sagisaka, Kanagawa (JP);
Daisuke Goto, Kanagawa (JP);
Tamotsu Horiuchi, Shizuoka (JP);
Hiroyuki Takahashi, Kanagawa (JP);
Fuminari Kaneko, Kanagawa (JP);
Mamiko Inoue, Kanagawa (JP); Tohru Yashiro, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/375,824

(22) Filed: Dec. 12, 2016

(65) Prior Publication Data
US 2017/0168366 A1    Jun. 15, 2017

(30) Foreign Application Priority Data

Dec. 15, 2015 (JP) .................................. 2015-244568
Nov. 17, 2016 (JP) .................................. 2016-224117

(51) Int. Cl.
*G02F 1/15* (2006.01)
*G02F 1/155* (2006.01)
(Continued)

(52) U.S. Cl.
CPC .............. *G02F 1/1527* (2013.01); *C09K 9/02* (2013.01); *G02F 1/153* (2013.01); *G02F 1/155* (2013.01);
(Continued)

(58) Field of Classification Search
CPC ........ G02F 1/15; G02F 1/1521; G02F 1/1525; G02F 1/1527; G02F 1/153; G02F 1/155;
(Continued)

(56) References Cited

U.S. PATENT DOCUMENTS 5,408,344 A    4/1995   Takiguchi et al.
6,061,042 A    5/2000   Takahashi et al.
(Continued)

FOREIGN PATENT DOCUMENTS

JP    2005-275227    10/2005
JP    2007-041259    2/2007
(Continued)

OTHER PUBLICATIONS

K. Choi, et al., "High Contrast Ratio and Rapid Switching Organic Polymeric Electrochromic Thin Films Based on Triarylamine Derivatives from Layer-by-Layer Assembly" Chem. Mater., 2006,18, pp. 5823-5825.
(Continued)

*Primary Examiner* — Loha Ben
(74) *Attorney, Agent, or Firm* — Cooper & Dunham LLP

(57) ABSTRACT

An electrochromic element is provided. The electrochromic element includes a first electrode, a second electrode, an electrolyte disposed between the first electrode and the second electrode, a first layer overlying the first electrode, and a second layer overlying the second electrode. The first layer contains an oxidizable color-developing electrochromic compound. The second layer contains a compound having the following formula (1):
(Continued)

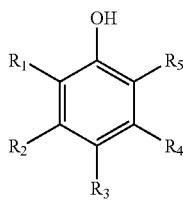

Formula (1)

wherein each of $R_1$ to $R_5$ independently represents a hydrogen atom, a halogen atom, or a monovalent organic group, and at least one of $R_1$ to $R_5$ includes a functional group directly or indirectly bindable to a hydroxyl group (OH).

7 Claims, 3 Drawing Sheets

(51) Int. Cl.
  *C09K 9/02* (2006.01)
  *G02F 1/153* (2006.01)
  *C09K 9/00* (2006.01)
(52) U.S. Cl.
  CPC ............. *G02F 1/1525* (2013.01); *C09K 9/00* (2013.01); *C09K 2211/1007* (2013.01); *C09K 2211/1014* (2013.01); *G02F 1/15* (2013.01); *G02F 2001/1555* (2013.01); *G02F 2202/36* (2013.01)
(58) Field of Classification Search
  CPC ..... G02F 2001/1515; G02F 2001/1517; G02F 2001/1555; G02F 2202/36; C09K 9/00; C09K 9/02; C09K 2211/1007; C09K 2211/1014; C09K 2211/1029; G02C 7/10; G02C 7/108
  USPC ................ 359/265, 267–270, 272, 273, 275; 252/582, 583, 586; 345/105
  See application file for complete search history.

(56) References Cited

U.S. PATENT DOCUMENTS

| | | | |
|---|---|---|---|
| 6,067,184 A | 5/2000 | Bonhote et al. | |
| 6,151,093 A | 11/2000 | Takiguchi et al. | |
| 6,320,571 B1 | 11/2001 | Takahashi et al. | |
| 6,426,827 B1 | 7/2002 | Bonhote et al. | |
| 7,450,292 B1* | 11/2008 | Burrell | B60R 1/088 252/583 |
| 7,463,400 B1* | 12/2008 | Tatsuura | G02F 1/15 359/265 |
| 7,633,669 B2* | 12/2009 | Burrell | B60R 1/088 359/265 |
| 9,011,727 B2* | 4/2015 | Cliff | C09K 9/02 210/757 |
| 2001/0005246 A1 | 6/2001 | Takiguchi et al. | |
| 2002/0181068 A1 | 12/2002 | Bonhote et al. | |
| 2003/0184644 A1 | 10/2003 | Takahashi et al. | |
| 2005/0104136 A1 | 5/2005 | Edwards et al. | |
| 2006/0125911 A1 | 6/2006 | Takahashi et al. | |
| 2006/0204866 A1 | 9/2006 | Hirano et al. | |
| 2007/0024948 A1 | 2/2007 | Hirano et al. | |
| 2008/0013152 A1 | 1/2008 | Hirano et al. | |
| 2009/0231663 A1 | 9/2009 | Hirano et al. | |
| 2009/0231664 A1 | 9/2009 | Shibuya et al. | |
| 2011/0222139 A1 | 9/2011 | Naijo et al. | |
| 2011/0279884 A1 | 11/2011 | Fujimura et al. | |
| 2012/0033286 A1 | 2/2012 | Yashiro et al. | |
| 2012/0050838 A1 | 3/2012 | Hirano et al. | |
| 2012/0139824 A1 | 6/2012 | Takahashi et al. | |
| 2012/0154892 A1 | 6/2012 | Yashiro et al. | |
| 2012/0194894 A1* | 8/2012 | Yashiro | C07D 213/38 359/270 |
| 2013/0135703 A1* | 5/2013 | Okada | G02F 1/155 359/269 |
| 2013/0258439 A1 | 10/2013 | Naijo et al. | |
| 2013/0335802 A1 | 12/2013 | Kim et al. | |
| 2014/0078569 A1 | 3/2014 | Takahashi et al. | |
| 2014/0268284 A1 | 9/2014 | Naijo et al. | |
| 2015/0168796 A1 | 6/2015 | Yashiro et al. | |
| 2015/0198857 A1 | 7/2015 | Yashiro et al. | |
| 2015/0274761 A1 | 10/2015 | Sagisaka et al. | |
| 2015/0331295 A1 | 11/2015 | Takahashi et al. | |
| 2015/0378233 A1 | 12/2015 | Fujimura et al. | |
| 2016/0005375 A1 | 1/2016 | Naijo et al. | |
| 2016/0108072 A1* | 4/2016 | Inoue | G02F 1/155 359/266 |
| 2016/0209721 A1 | 7/2016 | Matsumoto et al. | |
| 2017/0226413 A1* | 8/2017 | Goto | C09K 9/02 |
| 2017/0235203 A1* | 8/2017 | Yamamoto | G02F 1/1521 359/268 |

FOREIGN PATENT DOCUMENTS

| | | |
|---|---|---|
| JP | 2009-145458 | 7/2009 |
| JP | 2014-021452 | 2/2014 |
| JP | 2016-038572 | 3/2016 |
| JP | 2016-045464 | 4/2016 |
| WO | 2006/008776 A1 | 1/2006 |

OTHER PUBLICATIONS

M. Li, et al., "Highly contrasted and stable electrochromic device based on well-matched viologen and triphenylamine", Organic Electronics, 2014, 15, pp. 428-434.
European search report dated May 11, 2017 in connection with corresponding European patent application No. 16202016.8.

* cited by examiner

ELECTROCHROMIC ELEMENT

CROSS-REFERENCE TO RELATED APPLICATIONS

This patent application is based on and claims priority pursuant to 35 U.S.C. § 119(a) to Japanese Patent Application Nos. 2015-244568 and 2016-224117, filed on Dec. 15, 2015 and Nov. 17, 2016, respectively, in the Japan Patent Office, the entire disclosure of each of which is hereby incorporated by reference herein.

BACKGROUND

Technical Field

The present disclosure relates to an electrochromic element.

Description of the Related Art

Electrochromism is the phenomenon displayed by some materials of reversibly changing color as a redox reaction reversibly occurs in the materials in response to a voltage. Electrochromic elements are known that reversibly change color as a redox reaction occurs therein. Generally, an electrochromic element includes a pair of electrodes facing each other with an ion-conductive electrolyte layer disposed between the electrodes. In a case in which a reduction reaction occurs in proximity to one of the electrodes, an oxidization reaction (i.e., the reverse reaction of the reduction reaction) occurs in proximity to the other one of the electrodes. When applying such an electrochromic element to a transparent display device, or a color developing device using a laminated layer of cyan, magenta, and yellow color developing layers, the electrochromic element needs to contain a material that can become colorless and transparent.

Examples of such a material include viologen compounds that exhibit transparency when in a neutral state and develop color when in a reduced state. In addition, triarylamine compounds are known as oxidizable color-developing electrochromic materials that exhibit transparency when in a neutral state and develop color when in a reduced state.

SUMMARY

In accordance with some embodiments of the present invention, an electrochromic element is provided. The electrochromic element includes a first electrode, a second electrode, an electrolyte disposed between the first electrode and the second electrode, a first layer overlying the first electrode, and a second layer overlying the second electrode. The first layer contains an oxidizable color-developing electrochromic compound. The second layer contains a compound having the following formula (1):

Formula (1)

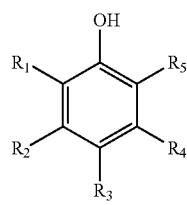

wherein each of $R_1$ to $R_5$ independently represents a hydrogen atom, a halogen atom, or a monovalent organic group, and at least one of $R_1$ to $R_5$ includes a functional group directly or indirectly bindable to a hydroxyl group (OH).

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
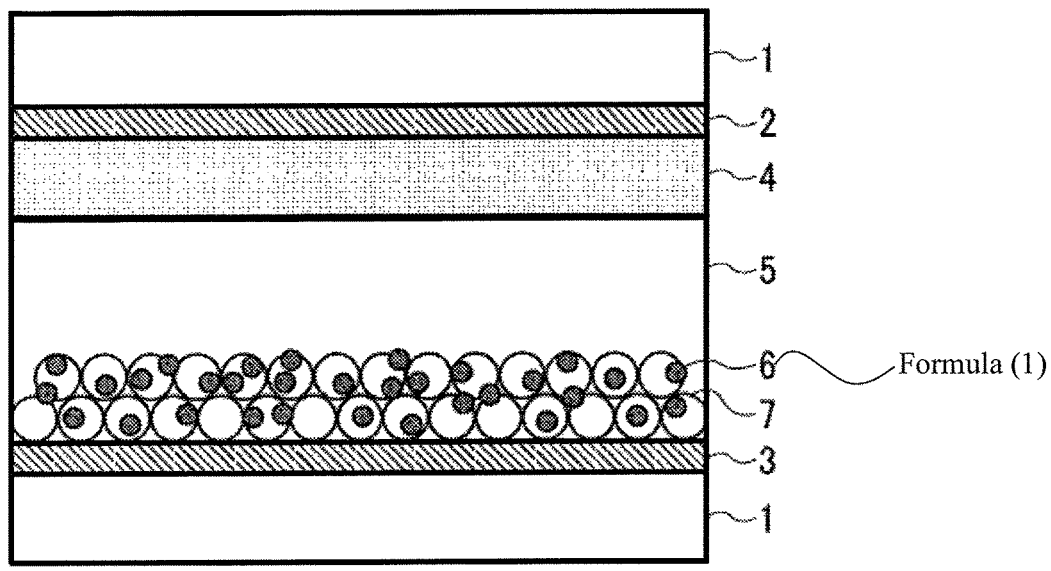
FIG. 1 is a schematic cross-sectional view of an electrochromic element according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Within the context of the present disclosure, if a first layer is stated to be "overlaid" on, or "overlying" a second layer, the first layer may be in direct contact with a portion or all of the second layer, or there may be one or more intervening layers between the first and second layer, with the second layer being closer to the substrate than the first layer.

The inventors of the present invention have found that an electrochromic element can be driven at a low voltage when a layer containing a compound having a phenol structure, particularly a hindered phenol structure, is disposed on one of the electrodes (i.e., the second electrode) in the element.

In accordance with some embodiments of the present invention, an electrochromic element containing an oxidizable color-developing electrochromic compound that can be driven at a low voltage is provided. This electrochromic element is capable of expressing the pure color of the oxidizable color-developing electrochromic compound, since this element has no absorption within a visible range and develops no color when undergoing a reduction reaction.

Electrochromic Element

The electrochromic element according to some embodiments of the present invention includes a first electrode, a second electrode, and an electrolyte disposed between the first electrode and the second electrode.

The electrochromic element further includes: a first layer containing an oxidizable color-developing electrochromic compound, overlying the first electrode; and a second layer containing a compound having the following formula (1), overlying the second electrode.

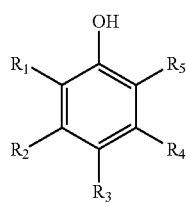

Formula (1)

In the formula (1), each of $R_1$ to $R_5$ independently represents a hydrogen atom, a halogen atom, or a monovalent organic group, and at least one of $R_1$ to $R_5$ includes a functional group directly or indirectly bindable to a hydroxyl group (OH).

Compound having Formula (1)

The compound having the formula (1) is disposed overlying the second electrode. The compound may be either directly or indirectly disposed on the second electrode. In the latter case, the compound may be bound or adsorbed to a counter electrode layer that is directly disposed on the second electrode. Alternatively, the compound may be in a mixed state thereof.

Each of $R_1$ to $R_5$ independently represents a hydrogen atom, a halogen atom, or a monovalent organic group.

Specific examples of the monovalent organic group include, but are not limited to, -hydroxyl group, nitro group, carboxyl group, alkoxycarbonyl group which may have a substituent, aryloxycarbonyl group which may have a substituent, alkylcarbonyl group which may have a substituent, arylcarbonyl group which may have a substituent, monoalkylaminocarbonyl group which may have a substituent, dialkylaminocarbonyl group which may have a substituent, monoarylaminocarbonyl group which may have a substituent, diarylaminocarbonyl group which may have a substituent, sulfonic acid group, alkoxysulfonyl group which may have a substituent, aryloxysulfonyl group which may have a substituent, alkylsulfonyl group which may have a substituent, arylsulfonyl group which may have a substituent, sulfonamide group, monoalkylaminosulfonyl group which may have a substituent, dialkylaminosulfonyl group which may have a substituent, monoarylaminosulfonyl group which may have a substituent, diarylaminosulfonyl group which may have a substituent, amino group, monoalkylamino group which may have a substituent, dialkylamino group which may have a substituent, alkyl group which may have a substituent, alkenyl group which may have a substituent, alkynyl group which may have a substituent, aryl group which may have a substituent, alkoxy group which may have a substituent, aryloxy group which may have a substituent, alkylthio group which may have a substituent, arylthio group which may have a substituent, and heterocyclic group which may have a substituent.

Among these groups, alkyl group, alkoxy group, hydrogen atom, aryl group, aryloxy group, heteroaryl group, heteroaryloxy group, halogen group, alkenyl group, and alkynyl group are preferred, from the aspect of stable behavior and light resistance.

Specific examples of the halogen atom include, but are not limited to, fluorine atom, chlorine atom, bromine atom, and iodine atom.

Specific examples of the alkyl group include, but are not limited to, methyl group, ethyl group, propyl group, and butyl group.

Specific examples of the aryl group include, but are not limited to, phenyl group and naphthyl group.

Specific examples of the aralkyl group include, but are not limited to, benzyl group, phenethyl group, and naphthylmethyl group.

Specific examples of the alkoxy group include, but are not limited to, methoxy group, ethoxy group, and propoxy group.

Specific examples of the aryloxy group include, but are not limited to, phenoxy group, 1-naphthyloxy group, 2-naphthyloxy group, 4-methoxyphenoxy group, and 4-methylphenoxy group.

Specific examples of the heterocyclic group include, but are not limited to, carbazole, dibenzofuran, dibenzothiophene, oxadiazole, and thiadiazole.

The substituent may be further substituted with a substituent, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g., benzyl group, phenethyl group).

Specific examples of the functional group directly or indirectly bindable to hydroxyl group include, but are not limited to, phosphonic acid group, phosphoric acid group, carboxylic acid group, sulfonyl group, silyl group, silanol group, and the following compounds.

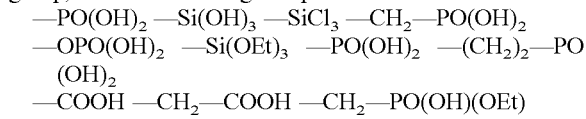

The functional group directly or indirectly bindable to hydroxyl group may have an alkyl group, an aryl group, or an alkyl-group-substituted aryl group. Specific examples of the alkyl group include, but are not limited to, methyl group, ethyl group, propyl group, and butyl group. Specific examples of the aryl group include, but are not limited to, phenyl group and naphthyl group.

Specific examples of the compound having the formula (1) include, but are not limited to, the following compounds (1) to (6).

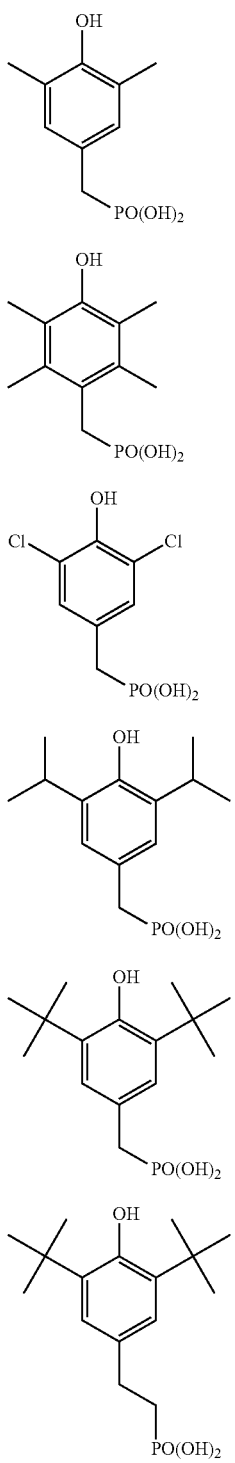

Compound (1)
Compound (2)
Compound (3)
Compound (4)
Compound (5)
Compound (6)

Oxidizable Color-Developing Electrochromic Compound

The oxidizable color-developing electrochromic compound is contained in the first layer that is disposed overlying the first electrode. Examples of the oxidizable color-developing electrochromic compounds include azobenzene compounds, tetrathiafulvalene compounds, triphenylmethane compounds, triphenylamine compounds, and leuco dyes. Among these compounds, triphenylamine compounds are preferable.

Specific examples of the triarylamine compounds include, but are not limited to, the following compounds having the formulae (2) to (4).

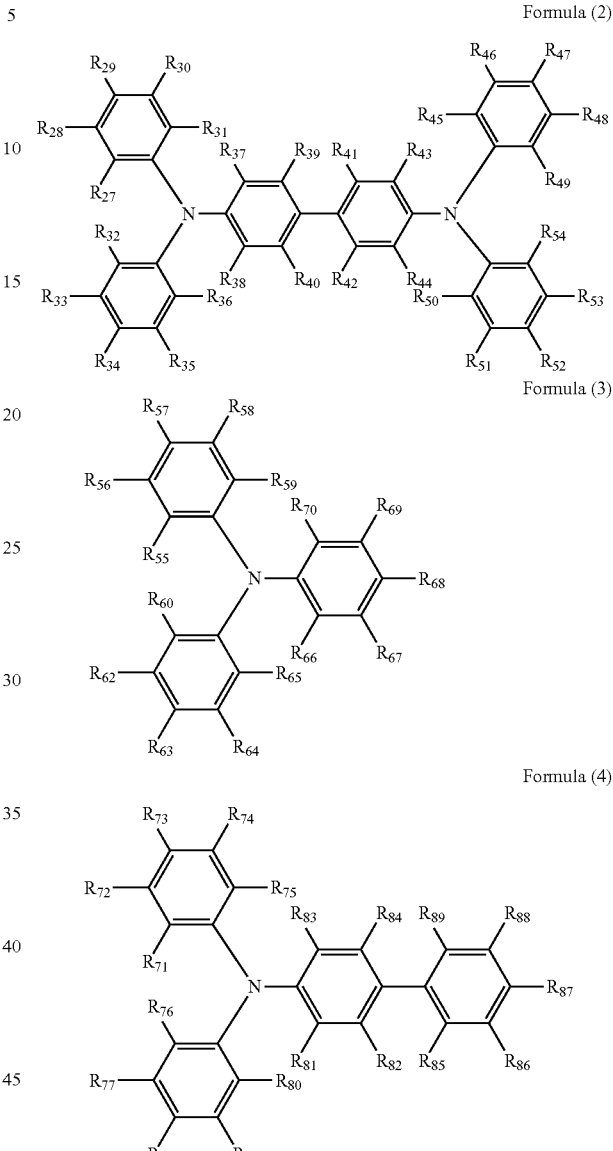

Formula (2)

Formula (3)

Formula (4)

In the formulae (2) to (4), each of $R_{27}$ to $R_{89}$ independently represents a monovalent organic group.

Specific examples of the monovalent group include the above-described examples of $R_1$ to $R_5$ in the formula (1).

The first layer containing the oxidizable color-developing electrochromic compound is not limited in configuration so long as it exhibits compatibility with the electrolyte. For example, the first layer may be directly disposed on the first electrode in the form of a low-molecular layer or a cured layer cured with an optical cross-linker such as acrylate and methacrylate. Alternatively, the first layer may be bound or adsorbed to carrier particles or conductive particles.

Preferably, the first layer containing the oxidizable color-developing electrochromic compound has an average thickness of from 0.1 to 30 μm, and more preferably from 0.4 to 10 μm.

Preferably, the compound having the formula (1) is bonded or adsorbed to a conductive or semiconductive nanostructural body disposed on the second electrode. From the aspect of transparency and conductivity, preferably, the conductive or semiconductive nanostructural body is composed of a metal oxide. Specific examples of the metal oxide include, but are not limited to, titanium oxide, zinc oxide, tin oxide, zirconium oxide, cerium oxide, yttrium oxide, phosphorous oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, and calcium phosphate. Each these metal oxides can be used alone or combination with others.

First Electrode and Second Electrode

The first electrode and the second electrode include a material having conductivity and transparency. Specific examples of such a material include, but are not limited to, inorganic materials such as tin-doped indium oxide (ITO), fluorine-doped tin oxide (FTO), antimony-doped tin oxide (ATO), and zinc oxide. In particular, InSnO, GaZnO, SnO, $In_2O_3$, and ZnO are preferable.

Alternatively, a conductivity-improved transparent electrode, formed of a fine network of transparent carbon nanotubes and other highly-conductive non-transmissive materials such as Au, Ag, Pt, and Cu, may be used.

The thicknesses of the first electrode and the second electrode are so adjusted that these electrodes have proper electric resistance values required for causing a redox reaction in the electrochromic layer (i.e., first layer containing an oxidizable color-developing electrochromic compound).

When the first electrode and the second electrode are made of ITO, the thicknesses thereof are preferably in the range of from 50 to 500 nm.

The first electrode and the second electrode can be formed by coating, printing, vacuum vapor deposition, sputtering, ion plating, or the like method.

Specific examples of the coating method include, but are not limited to, spin coating, casting, micro gravure coating, gravure coating, bar coating, roll coating, wire bar coating, dip coating, slit coating, capillary coating, spray coating, and nozzle coating.

Specific examples of the printing method include, but are not limited to, gravure printing, screen printing, flexo printing, offset printing, reverse printing, and inkjet printing.

Electrolyte

The electrolyte is interposed between the first electrode and the second electrode.

Specific materials usable for the electrolyte include, but are not limited to, inorganic ion salts (e.g., alkali metal salts, alkali-earth metal salts), quaternary ammonium salts, and supporting salts of acids and bases. More specifically, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$, can be used.

In addition, ionic liquids can also be used as the electrolyte. In particular, organic ionic liquids are preferable because they exhibit liquidity in a wide temperature range including room temperature owing to their molecular structure.

Specific examples of cationic components in such organic liquids include, but are not limited to, imidazole derivatives (e.g., N,N-dimethylimidazole salt, N,N-methylethylimidazole salt, N,N-methylpropylimidazole salt), pyridinium derivatives (e.g., N,N-dimethylpyridinium salt, N,N-methylpropylpyridinium salt), and aliphatic quaternary ammonium salts (e.g., trimethylpropylammonium salt, trimethylhexylammonium salt, triethylhexylammonium salt). In view of stability in the atmosphere, specific preferred examples of anionic components in such organic ionic liquids include, but are not limited to, fluorine-containing compounds such as $BF_4^-$, $CF_3SO_3^-$, $PF_4^-$, and $(CF_3SO_2)_2N^-$.

Ionic liquids in which the above-described cationic and anionic components are combined are preferably used as the electrolyte.

The ionic liquid may be directly dissolved in a photopolymerizable monomer, an oligomer, or a liquid crystal material. When solubility is poor, the ionic liquid may be dissolved in a small amount of a solvent, and the resulting solution may be mixed with a photopolymerizable monomer, an oligomer, or a liquid crystal material.

Specific examples of the solvent include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, alcohols, and mixed solvents thereof.

The electrolyte need not necessarily be a low-viscosity liquid and may be in the form of gel, cross-linked polymer, liquid crystal dispersion, or the like. Electrolytes in the form of gel or solid are advantageous in terms of strength and reliability of the element.

Preferably, the electrolyte is retained in a polymer resin together with a solvent, for reliable fixation. The electrolyte thus secured provides high ion conductivity and solid strength.

It is preferable that the polymer resin is a photo-curable resin. When the polymer resin is a photo-curable resin, an element can be produced at a lower temperature within a shorter time period, compared to a case in which a thin film is formed through thalami polymerization or solvent evaporation.

An electrolyte layer containing the electrolyte preferably has an average thickness of from 100 nm to 100 μm.

Counter Electrode Layer

The counter electrode layer has a function of undergoing the reverse reaction relative to a reaction occurring in the electrochromic layer (i.e., the first layer containing an oxidizable color-developing electrochromic compound), to balance the charge between the electrochromic layer and the counter electrode layer. Thus, the first electrode and the second electrode are prevented from being corroded or deteriorated through a redox reaction irreversibly occurring in these layers. Here, the reverse reaction of the counter electrode layer includes both a redox reaction and an action as a capacitor.

The counter electrode layer may include any material having a function of preventing the first electrode and the second electrode from being corroded through a redox reaction irreversibly occurring in the above layers. Specific materials usable for the counter electrode layer include, but are not limited to, antimony tin oxide, nickel oxide, titanium oxide, zinc oxide, tin oxide, and conductive or semiconductive metal oxides containing two or more of these materials.

The counter electrode layer may be formed of a porous thin film that does not inhibit injection of the electrolyte, for more reliable deterioration prevention. Such a porous thin film providing excellent electrolyte permeability and anti-deterioration property can be obtained by, for example, fixing fine particles of a conductive or semiconductive metal oxide (e.g., antimony-tin oxide, nickel oxide, titanium oxide, zinc oxide, tin oxide) on the second electrode with a binder (e.g., acrylic binder, alkyd binder, isocyanate binder, urethane binder, epoxy binder, phenol binder).

Other Members

The electrochromic element may further include other components, such as a substrate, an insulating porous layer, and a protective layer.

Substrate

The substrate may be made of an organic or inorganic transparent material that is capable of supporting the above layers.

For example, glass substrates made of non-alkali-glass, borosilicate glass, float glass, or soda-lime glass may be used as the substrate. In addition, resin substrates made of polycarbonate resin, acrylic resin, polyethylene, polyvinyl chloride, polyester, epoxy resin, melamine resin, phenol resin, polyurethane resin, and polyimide resin, may be used as the substrate. The substrate may have a surface coating such as a transparent insulating layer, a UV cut layer, or an antireflection layer, for improving vapor barrier property, gas barrier property, ultraviolet resistance, and visibility.

The substrate may be in the form of a rectangular or a circle, but its form is not limited thereto.

The substrate may be a laminated body in which multiple materials are laminated. As an example, the element having a configuration in which two glass substrates are sandwiching the electrochromic layers, etc., provides improved vapor barrier property and gas barrier property.

Insulating Porous Layer

The insulating porous layer has functions of both electrically insulating the first electrode and the second electrode from each other and holding the electrolyte.

The insulating porous layer is made of a porous material. In particular, porous organic, inorganic, or organic-inorganic composite material having high insulation property, durability, and film-formation property are preferably used.

The insulating porous layer can be formed by the following methods: a sintering method in which polymer fine particles or inorganic particles are partially fused with each other via a binder to form pores between the particles; an extraction method in which solvent-soluble organic or inorganic substances and solvent-insoluble binders are formed into a layered structure, and the organic or inorganic substances are dissolved with a solvent to form pores; a foaming method; a phase inversion method in which a mixture of polymers is subjected to phase separation by handling a good solvent and a poor solvent; and a radiation irradiation method in which pores are formed by means of radiation.

Protective Layer

The protective layer has functions of protecting the electrochromic element from external stress and chemicals used in the washing process, preventing the electrolyte from leaking from the electrochromic element, and preventing the electrochromic element from being intruded by unnecessary substances, such as moisture and oxygen in the air, for its stable operation.

The protective layer may include an ultraviolet-curable or heat-curable resin such as acrylic resin, urethane resin, and epoxy resin.

The protective layer preferably has a thickness in the range of 1 to 200 μm.

FIG. 1 is a schematic cross-sectional view of an electrochromic element according to an embodiment of the present invention.

The electrochromic element illustrated in FIG. 1 includes a substrate 1, a first electrode 2, a second electrode 3 facing the first electrode 2 with a gap therebetween, and an electrolyte 5 disposed between the first electrode 2 and the second electrode 3.

The electrochromic element further includes a layer 4 containing an oxidizable color-developing electrochromic compound, disposed on one surface of the first electrode 2. The electrochromic element further includes a counter electrode layer 7 to which a compound 6 having the formula (1) is adhered or adsorbed. The layer 4 develops color when undergoing an oxidization reaction and discharges color when undergoing a reduction reaction (i.e., the reverse reaction of the oxidization reaction), on the surface of the first electrode 2.

Use Application

The electrochromic element according to some embodiments of the present invention provides superior operational stability, transparency, and light resistance. Thus, the electrochromic elements can be used, for example, for large-size displays such as electrochromic display and stock price display, dimming elements such as anti-dazzle mirror and dimming glass, low-voltage driving elements such as touch-panel-type key switch, optical switch, optical memory, electronic paper, and electronic album.

EXAMPLES

Further understanding of the present disclosure can be obtained by reference to certain specific examples provided herein below for the purpose of illustration only and are not intended to be limiting. In the following description, the numbers represent mass ratios in parts, unless otherwise specified.

Example 1

Formation of Electrochromic Layer on First Electrode

An oxidizable color-developing electrochromic composition containing the materials listed below was prepared, for forming an electrochromic layer on the first electrode.

An oxidizable color-developing triarylamine compound having the following formula (A): 50 parts

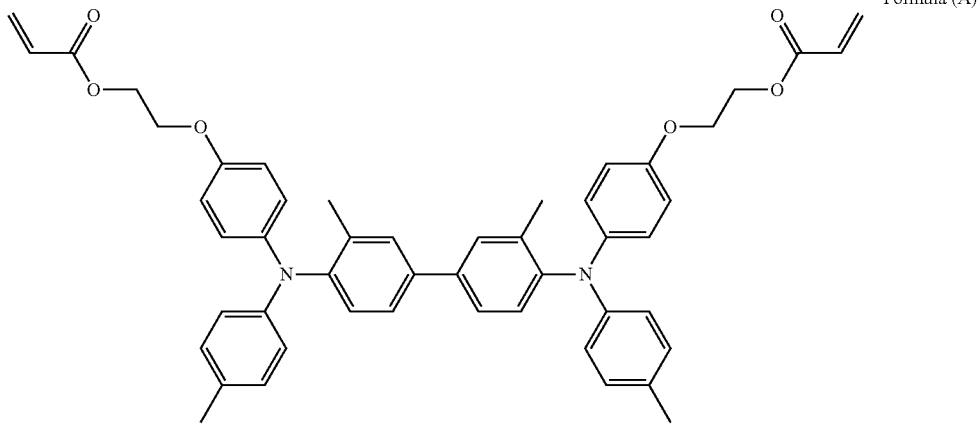

Formula (A)

IRGACURE 184 (available from BASF Japan Ltd.): 5 parts

PEG400DA containing a difunctional acrylate (available from Nippon Kayaku Co., Ltd.): 50 parts Methyl ethyl ketone: 900 parts The oxidizable color-developing electrochromic composition was applied onto an ITO glass substrate (having an area of 40 mm×40 mm, a thickness of 0.7 mm, and an ITO film thickness of about 100 nm), serving as the first electrode, by a spin coating method. The resulting coating layer was exposed to ultraviolet ray emitted from an UV emitter (SPOT CURE available from Ushio Inc.) at 10 mW for 60 seconds, and then subjected to an annealing treatment at 60° C. for 10 minutes. Thus, a cross-linked electrochromic layer having an average thickness of 0.4 μm was formed.

Formation of Counter Electrode Layer on Second Electrode

A titanium oxide nano particle dispersion liquid (SP210 available from Showa Titanium Co., Ltd., having an average particle diameter of about 20 nm) was applied onto an ITO glass substrate (having an area of 40 mm×40 mm, a thickness of 0.7 mm, and an ITO film thickness of about 100 nm), serving as the second electrode, by a spin coating method, and then subjected to an annealing treatment at 120° C. for 15 minutes. Thus, a titanium oxide particle film having a thickness of 1.0 μm was formed. The titanium oxide particle film also serves as an anti-deterioration layer.

Next, a composition containing 5 parts of a compound having the following formula (B) and 95 parts of methanol was prepared and applied onto the titanium oxide particle film by a spin coating method. Thus, a counter electrode layer was formed.

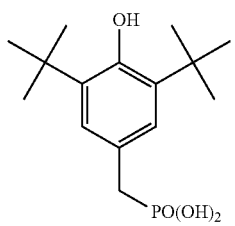

Formula (B)

Preparation of Electrolyte

An electrolyte liquid containing the following materials was prepared.

IRGACURE 184 (available from BASF Japan Ltd.): 5 parts

PEG400DA (available from Nippon Kayaku Co., Ltd.): 100 parts

1-Ethyl-3-methylimidazolium tetracyanoborate (available from Merk KGaA): 50 parts Preparation of Electrochromic Element The above-prepared electrolyte liquid in an amount of 30 mg was weighed with a micro pipette and dropped onto the counter electrode layer on the ITO glass substrate. Further, the other ITO glass substrate having the cross-lined electrochromic layer thereon was laminated on the ITO glass substrate having the counter electrode layer thereon, such that the cross-linked electrochromic layer faced the counter electrode layer and that an extracted part of each electrode was formed.

The laminated element was exposed to ultraviolet ray (having a wavelength of 250 nm) emitted from an UV emitter (SPOT CURE available from Ushio Inc.) at 10 mW for 60 seconds. Thus, an electrochromic element was prepared.

Evaluation of Drive Voltage of Electrochromic Element

The above-prepared electrochromic element was subjected to an evaluation of color developing and discharging property as follows. The extracted parts of the first electrode and the second electrode were connected to measuring terminals for measuring a C-V profile.

Specifically, electric properties of the element were measured at a sweep rate of −50 mV/sec. At the same time, the average transmittance of the element within a wavelength range of from 380 to 780 nm was monitored through an instrument USB4000 (available from Ocean Optics, Inc.), to determine a color developing voltage that achieved when the average transmittance reached about 30% and a color discharging voltage achieved when the element returned to a color discharging state. As a result, the color developing voltage and the color discharging voltage were determined to be −2.4 V and +0.3 V, respectively.

Figure 2:
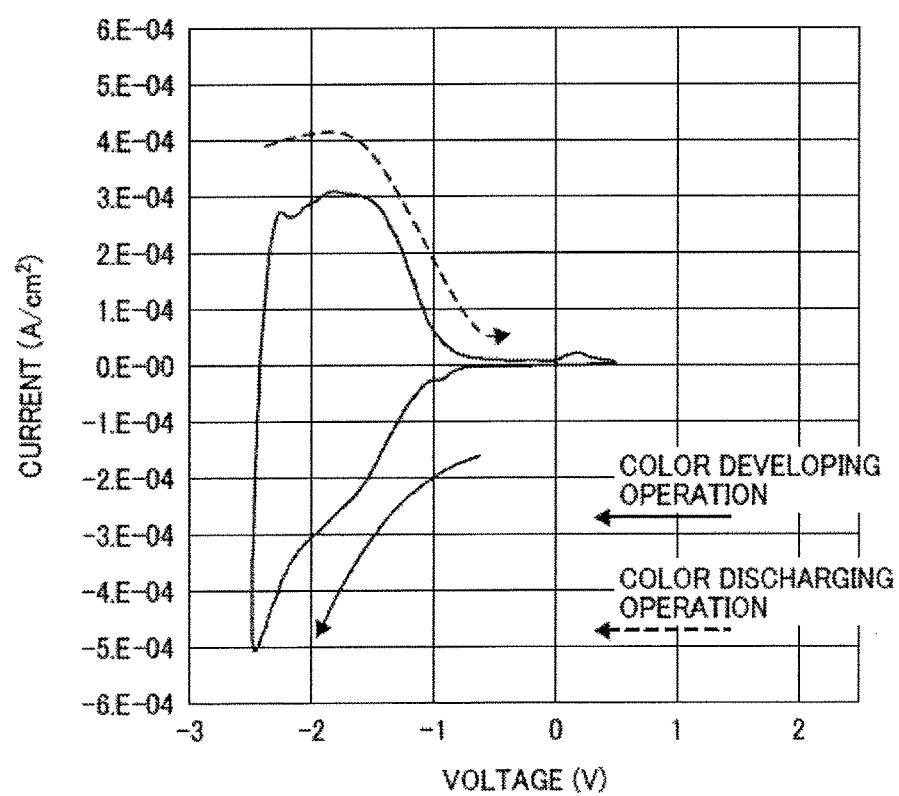
FIG. 2 is an I-V (current-voltage) characteristic diagram of an electrochromic element according to an embodiment of the present invention (Example 1), obtained through C-V (capacitance-voltage) profiling of the element.
Figure 3:
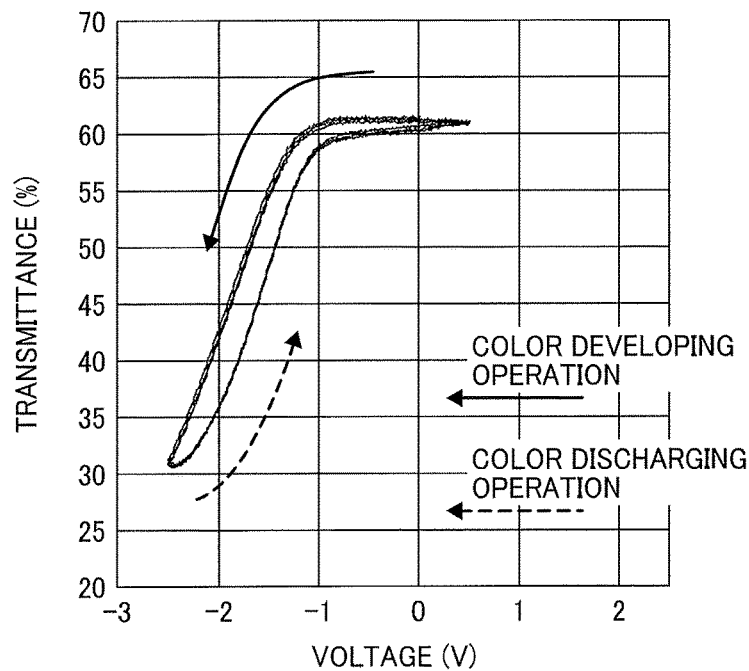
FIG. 3 is a T-V (transmittance-voltage) characteristic diagram of the electrochromic element of Example 1, obtained through C-V (capacitance-voltage) profiling and transmittance measurement.

Variation in current with respect to variation in voltage (I-V characteristic) and variation in transmittance with respect to variation in voltage (T-V characteristic) are presented in FIGS. 2 and 3, respectively.

Comparative Example 1

The procedure for preparing an electrochromic element in Example 1 was repeated except that the composition containing the compound having the formula (B) was not applied onto the titanium oxide particle film by a spin coating method, in "Formation of Counter Electrode Layer on Second Electrode". The resulting element was subjected to the measurement of color developing and discharging voltages in the same manner as in Example 1. As a result, the color developing voltage and the color discharging voltage were determined to be −2.4 V and +2.0 V, respectively.

Figure 4:
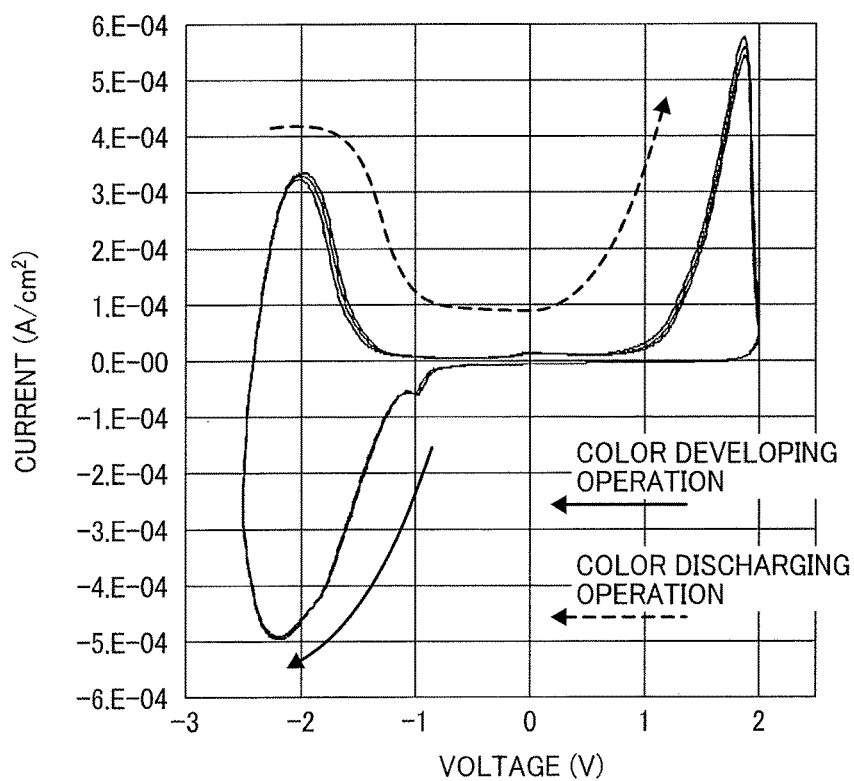
FIG. 4 is an I-V (current-voltage) characteristic diagram of a related-art electrochromic element (Comparative Example 1), obtained through C-V (capacitance-voltage) profiling of the element.
Figure 5:
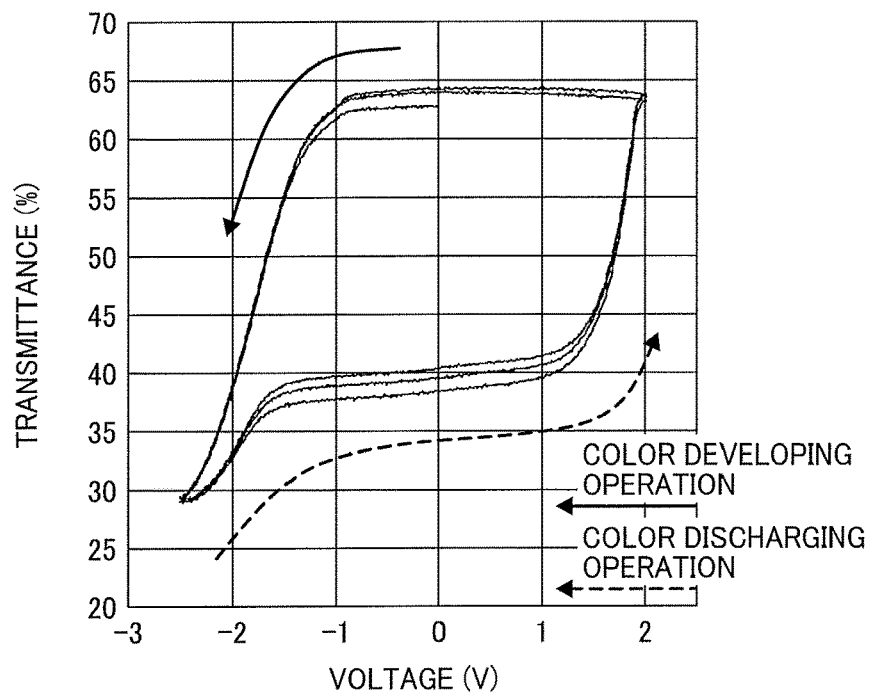
FIG. 5 is a T-V (transmittance-voltage) characteristic diagram of the related-art electrochromic element (Comparative Example 1), obtained through C-V (capacitance-voltage) profiling and transmittance measurement.

Variation in current with respect to variation in voltage (I-V characteristic) and variation in transmittance with respect to variation in voltage (T-V characteristic) are presented in FIGS. 4 and 5, respectively.

Comparative Example 2

Figure 6:
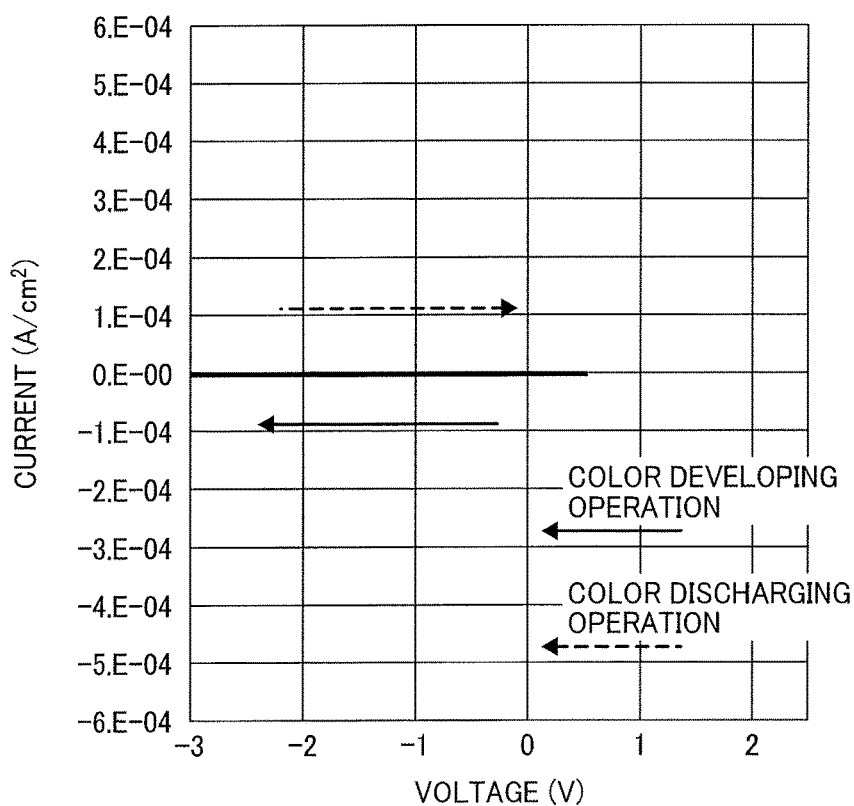
FIG. 6 is an I-V (current-voltage) characteristic diagram of another related-art electrochromic element (Comparative Example 2), obtained through C-V (capacitance-voltage) profiling of the element.

The procedure for preparing an electrochromic element in Example 1 was repeated except that, in place of the composition containing the compound having the formula (B), a composition containing 5 parts of a decyl sulfonic acid (available from Tokyo Chemical Industry Co., Ltd.) having the following formula (C) and 95 parts of methanol was applied onto the titanium oxide particle film by a spin coating method to from a counter electrode layer, in "Formation of Counter Electrode Layer on Second Electrode". The resulting element was subjected to the measurement of color developing and discharging voltages in the same manner as in Example 1. However, this element never developed color even when the applied voltage reached −5V. Variation in current with respect to variation in voltage (I-V characteristic) is presented in FIG. 6.

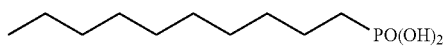

Formula (C)

Example 2

The procedure for preparing an electrochromic element in Example 1 was repeated except for replacing the compound having the formula (A) with another oxidizable color-developing electrochromic compound having the following formula (D). The resulting element was subjected to the measurement of color developing and discharging voltages in the same manner as in Example 1. The results are presented in Table 1.

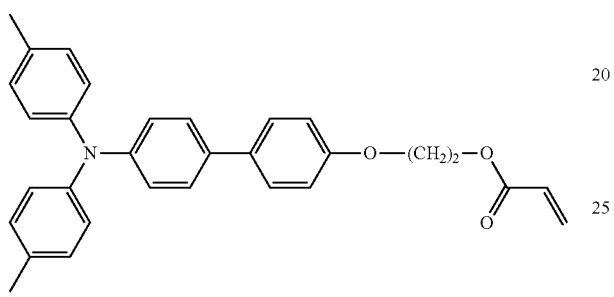

Formula (D)

Comparative Example 3

The procedure for preparing an electrochromic element in Example 2 was repeated except that the composition containing the compound having the formula (B) was not applied onto the titanium oxide particle film by a spin coating method, in "Formation of Counter Electrode Layer on Second Electrode". The resulting element was subjected to the measurement of color developing and discharging voltages in the same manner as in Example 1. The results are presented in Table 1.

Example 3

The procedure described in "Formation of Electrochromic Layer on First Electrode" in Example 1 was replaced with the procedure described below, for forming an electrochromic layer containing an oxidizable color-developing triarylamine compound.

First, a titanium oxide nano particle dispersion liquid (SP210 available from Showa Titanium Co., Ltd., having an average particle diameter of about 20 nm) was applied onto an ITO glass substrate (having an area of 40 mm×40 mm, an average thickness of 0.7 mm, and an ITO film thickness of about 100 nm), serving as the first electrode, by a spin coating method, and then subjected to an annealing treatment at 120° C. for 15 minutes. Thus, a titanium oxide particle film having a thickness of about 1.0 μm was formed.

Next, an oxidizable color-developing electrochromic composition containing the materials listed below was prepared, to be carried by the titanium oxide particle film.

An oxidizable color-developing triarylamine compound having the following formula (E): 50 parts Formula (E)

Methanol: 950 parts

The oxidizable color-developing electrochromic composition was applied onto the titanium oxide particle film by a spin coating method, and then subjected to an annealing treatment at 120° C. for 10 minutes. Thus, an electrochromic layer was formed on the titanium oxide particle film Next, an electrochromic element was prepared in the same manner as Example 1 except for replacing the first electrode used in Example 1 with the above-prepared first electrode. The element was subjected to the measurement of color developing and discharging voltages in the same manner as in Example 1. The results are presented in Table 1.

Comparative Example 4

The procedure for preparing an electrochromic element in Example 3 was repeated except that the composition containing the compound having the formula (B) was not applied onto the titanium oxide particle film by a spin coating method, in "Formation of Counter Electrode Layer on Second Electrode". The resulting element was subjected to the measurement of color developing and discharging voltages in the same manner as in Example 1. The results are presented in Table 1.

Example 4

The procedure described in "Formation of Electrochromic Layer on First Electrode" in Example 1 was replaced with the procedure described below, for forming an electrochromic layer containing an oxidizable color-developing triarylamine polymer.

First, an oxidizable color-developing electrochromic composition containing the materials listed below was prepared.

An oxidizable color-developing triarylamine polymer having the following formula (F): 50 parts

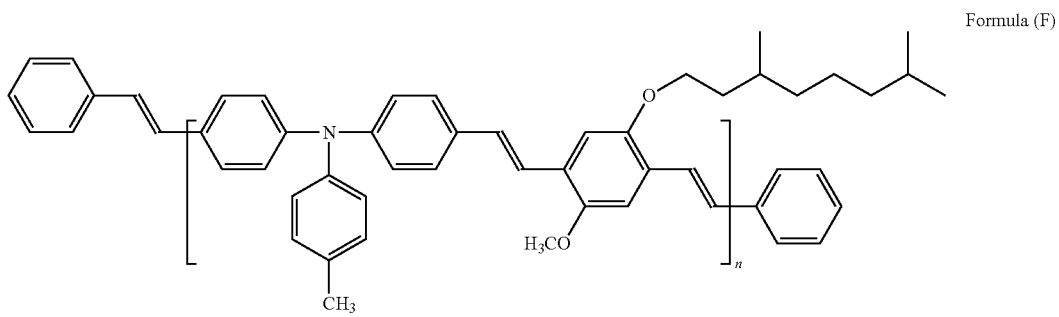

Formula (F)

In the formula (F), n represents an integer of from 150 to 180 (estimated from the polystyrene-converted molecular weight).

Toluene: 950 parts

The oxidizable color-developing electrochromic composition was applied onto an ITO glass substrate (having an area of 40 mm×40 mm, a thickness of 0.7 mm, and an ITO film thickness of about 100 nm) by a spin coating method, and then subjected to an annealing treatment at 120° C. for 10 minutes. Thus, an electrochromic layer was formed.

The procedure for preparing an electrochromic element in Example 1 was repeated except for replacing the electrochromic layer with that prepared above. The resulting element was subjected to the measurement of color developing and discharging voltages in the same manner as in Example 1. The results are presented in Table 1.

Comparative Example 5

The procedure for preparing an electrochromic element in Example 4 was repeated except that the composition containing the compound having the formula (B) was not applied onto the titanium oxide particle film by a spin coating method, in "Formation of Counter Electrode Layer on Second Electrode". The resulting element was subjected to the measurement of color developing and discharging voltages in the same manner as in Example 1. The results are presented in Table 1.

TABLE 1

|  | Color Developing Voltage (V) | Color Discharging Voltage (V) |  | Color Developing Voltage (V) | Color Discharging Voltage (V) |
|---|---|---|---|---|---|
| Example 1 | −2.4 | +0.3 | Comparative Example 1 | −2.4 | +2.0 |
| Example 2 | −2.4 | +0.3 | Comparative Example 3 | −2.4 | +2.0 |
| Example 3 | −2.4 | +0.8 | Comparative Example 4 | −2.4 | +2.2 |
| Example 4 | −2.3 | +1.0 | Comparative Example 5 | −2.3 | +2.0 |

As is clear from a comparison between Example 1 and Comparative Example 1, the presence of the compound having the formula (1) on the second electrode lowers the color discharging voltage of the element. Such an element with a low color discharging voltage can be driven at a low voltage. It could be argued that the low color discharging voltage in Example 1 is owing to the presence of the compound having the formula (1), since Comparative Example 2 using an alkyl phosphonic acid did not exhibit electrochromism.

The results described in Table 1 indicate that, in the case in which the compound having the formula (1) is disposed on the second electrode, the element can be driven at a low voltage regardless of the configuration of the element.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An electrochromic element comprising:
a first electrode;
a second electrode;
an electrolyte disposed between the first electrode and the second electrode;
a first layer overlying the first electrode, containing an oxidizable color-developing electrochromic compound; and
a second layer overlying the second electrode, containing a compound having the following formula (1):

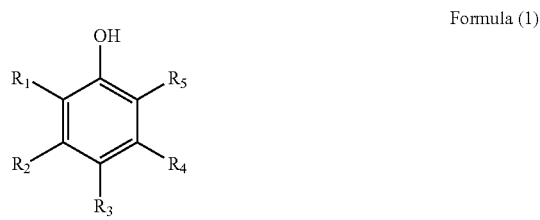

Formula (1)

wherein each of $R_1$ to $R_5$ independently represents a hydrogen atom, a halogen atom, or a monovalent organic group, and at least one of $R_1$ to $R_5$ includes a functional group directly or indirectly bindable to a hydroxyl group (OH).

2. The electrochromic element of claim 1, wherein the monovalent organic group is selected from the group consisting of an alkyl group, an alkenyl group, an alkynyl group, an aryl group, a heteroaryl group, an alkoxy group, an aryloxy group, and a heteroaryloxy group.

3. The electrochromic element of claim 1, wherein $R_3$ has the functional group directly or indirectly bindable to the hydroxyl group.

4. The electrochromic element of claim 1, wherein the functional group directly or indirectly bindable to the hydroxyl group is selected from the group consisting of phosphonic acid group, phosphoric acid group, carboxylic acid group, sulfonyl group, silyl group, and silanol group.

5. The electrochromic element of claim 1, wherein the functional group directly or indirectly bindable to the hydroxyl group has at least one group selected from the group consisting of an alkyl group, an aryl group, and an alkyl-group-substituted aryl group.

6. The electrochromic element of claim 1, further comprising a conductive or semiconductive nanostructural body disposed on the second electrode,
  wherein the compound having the formula (1) is bound or adsorbed to the conductive or semiconductive nanostructural body.

7. The electrochromic element of claim 1, wherein the second layer is a counter electrode layer.

\* \* \* \* \*